March 17, 1936.
S. A. PLATT
2,034,190
ELECTRICAL CORN POPPER
Filed June 4, 1935
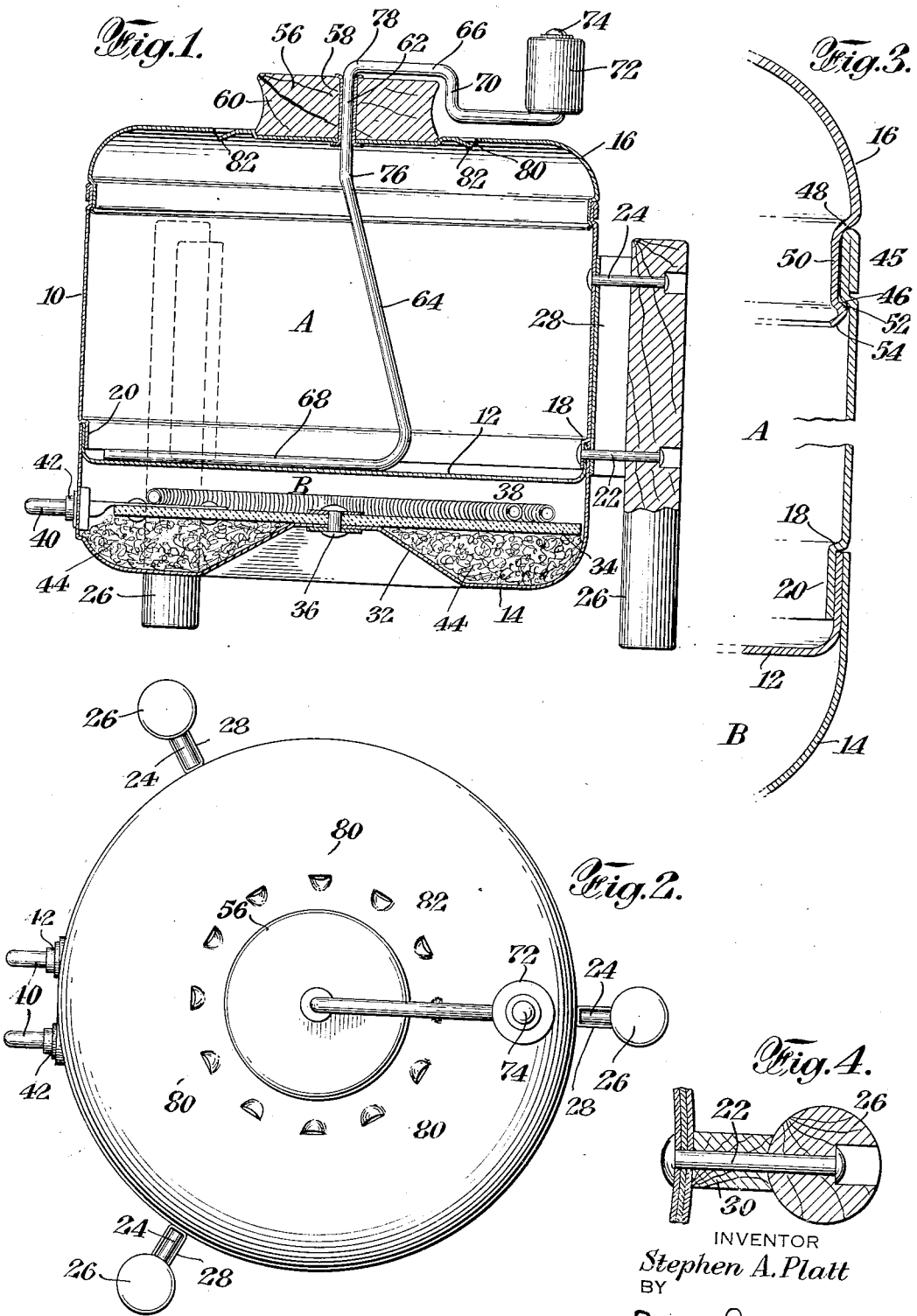
INVENTOR
Stephen A. Platt
BY
ATTORNEYS Patented Mar. 17, 1936                                                                 2,034,190

UNITED STATES PATENT OFFICE 2,034,190

ELECTRICAL CORN POPPER

Stephen A. Platt, Decatur, Ill., assignor to U. S. Manufacturing Corporation, Decatur, Ill., a corporation of Illinois Application June 4, 1935, Serial No. 24,837

26 Claims. (Cl. 53—4)

This invention relates to an improved construction for an electrically heated corn popper.

Among the improvements which it embodies are the following: It permits the corn to be popped in oil or melted butter without allowing the spattered oil to work to the outside of the device through the cover joint or the pan joint or into the heating element chamber in the bottom of the device. The device is supported on special supports which act as non-heat conducting combined legs and handles. Means is embodied to direct the heat efficiently upwardly against the bottom of the corn-popping chamber and not to allow it to penetrate downwardly and be wasted by radiation from the bottom of the heating chamber or to injure the surface finish of a table or the like on which the device is supported. The cover is provided with an improved knob construction made of non-heat conducting material usable in connection with the combined leg and handle construction for conveniently removing the cover from the device without burning the fingers. Means is provided for venting the corn popping chamber without permitting the oil to spatter through the vents. A special stirrer construction is provided in combination with the knob construction of the cover. The metallic body of the device arranged to form the corn popping chamber and an underneath chamber for the electric heating element is made up of united superposed shallow pans and a cylindrical barrel portion partially telescoped in one another in a special way so as to provide an oil-proof joint therebetween and so as to avoid a more expensive construction involving a deep sided receptacle with an integral bottom.

With these and other objects in view as may hereinafter appear, my invention consists in the construction, arrangement and combination of parts hereinafter described and then sought to be defined in the claims, reference being had to the accompanying drawing which shows, for the purpose of illustrative disclosure, a preferred embodiment of my invention, it being understood however, that various changes may be made in practice within the scope of the claims without digressing from my inventive idea.

In the drawing:

Fig. 1 is a vertical cross sectional view partly in elevation of a preferred form of my improved corn popper;

Fig. 2 is a plan view looking down from above on the corn popper of Fig. 1;

Fig. 3 is an enlarged vertical section through one side of the corn popping and heating chambers and of the related portion of the cover; and Fig. 4 is an enlarged horizontal sectional view through a modification of the spacer and leg construction.

Referring to the drawing, the illustrative corn popper comprises a body adapted to be made of sheet metal and embodies a corn popping chamber A and an underneath chamber B containing the electric heating element. More particularly the body of the device comprises a cylindrical barrel member 10 and a bottom therefor consisting of two superposed pans 12 and 14 with an intervening space or chamber B in which is located the heating element. A removable lid 16 covers the mouth of the barrel member 10 and constitutes the top of the corn popping chamber A.

As shown in Figs. 1 and 3 the cylindrical wall of the upper pan 12 is telescoped snugly into the cylindrical mouth of the lower pan 14. The barrel member 10 has an inwardly directed annular shoulder 18 near its lower end leading to a cylindrical flange 20 of smaller diameter than the body of the barrel member, said smaller flange 20 being snugly telescoped into the mouth of the upper pan 12. The three plies of the aforesaid telescoped parts are riveted together to unite the parts permanently. See for example the rivets 22 in Figs. 1 and 2. The particular rivets shown are made long so as to constitute at the same time the means for attaching the legs 26.

The legs 26 consist of vertical rods made of wood or any other suitable non-heat conducting material. A spacer element is located between the side of each leg and the barrel member 10. This in Figs. 1 and 2 takes the form of a trough shaped member 28; and in Fig. 4 consists of a vertically elongated block or strip of wood or equivalent material or may consist of wooden spools 30, through which the rivets 22 and 24 pass. The parts are assembled as shown with the spacer elements between the legs 26 and the barrel member 10, the rivets 22 and 24 being inserted through alined holes in said parts and then headed over to secure all rigidly together. The rivet heads in the legs are preferably countersunk therein as shown.

The legs 26 are long enough to support the bottom of the device well above the table or other surface on which it is stood. The legs serve as such and also as handles to pick up the device even when hot, said legs or handles being sufficiently heat insulated from the metallic body of the device.

The lower pan 14 has an upwardly cupped center portion 32 as a support for a disc 34 of asbestos mill-board or equivalent heat-resistant electrical insulating material. A rivet 36 secures the disc in place. The disc supports the electrical heating element consisting of a resistance coil 38, the ends of which connect with a pair of electrical plug contacts 40 supported in porcelain insulator bushings 42 projecting through holes in the wall of the pan. Rock wool insulation 44 is packed in the pan below the asbestos disc and keeps the bottom of the pan so cool that the device can be stood on varnished surfaces without injuring them. Moreover this conserves and applies substantially all of the heat usefully to the bottom of the upper pan 12 to pop the corn in the chamber A.

The corn popper of this invention is especially designed to make it practical to pop the corn in oil or melted butter. Corn popped in oil or butter is much more tasty than corn that has been popped dry and has had a dressing applied to it after it has been popped. The oil or butter covers the bottom of the upper pan to a depth of about a sixteenth of an inch. When the corn is being popped, the spattered oil running down the sides of the chamber A is returned to the pan where it belongs and is prevented by the previously described shoulder 18 and cylindrical flange 20 of the pan joint from working either to the outside of the device or down into the heating element chamber B. The rim of the cover 16 fits down into the mouth of the barrel member 10 and snaps into place and makes a splatter-proof joint so that the oil which has splattered up on the lid drains past the cover joint and down the side of the chamber A into the pan. Fig. 3 best shows the form of snap-on cover joint which I prefer. The mouth portion 45 of the barrel member 10 is folded over so as to be double-ply and so as to provide an inwardly directed shoulder 46. The cover has an inwardly directed shoulder 48 leading to and supporting a cylindrical flange 50 whose lip is bent first outwardly at 52 and then inwardly at 54 thereby forming an annular bead which is angular in vertical section as indicated in the figure. In applying the cover, it will be seen from Figs. 1 and 3 that the aforesaid annular bead will first strike the rounded double ply rim 45 of the barrel member 10 and will be cammed inwardly and will ride down into the mouth of the barrel member and finally snap under the shoulder 46 into the position shown. The shoulder 48 of the cover then rests against the double ply lip of the barrel member and serves as a stop; and the telescoped cylindrical surfaces of the cover and the barrel member make adequately tight contact.

A spool 56 of wood or equivalent non-heat conducting material is secured to the top of the cover by means of a tubular eyelet 58, the lower end of the spool being preferably seated in a shallow circular recess, as shown, formed in the cover. This spool is peripherally concaved as at 60 so that it can be firmly gripped to pull the hot cover off the device preparatory to dumping out the popped corn.

The shank portion 62 of the stirrer wire 64 passes through the tubular eyelet 58. This wire above the spool is bent so as to extend radially outward to form a handle 66 for rotating the stirrer so that the foot portion 68 of the wire circularly sweeps over the bottom of the pan and keeps the corn and other contents moving. The aforesaid handle portion 66 of the wire preferably has a downward bend in it at 70 adjacent the periphery of the spool. The knob of the handle consists of a spool 72 of heat insulating material swiveled on the vertically extending free end 74 of the wire.

The bend 76 in the stirrer wire below the cover spool 56 cooperates with the bend 78 above the spool to prevent the stirrer from becoming detached from the cover when the cover has been removed.

Vents 80 are provided in the cover to permit the escape of air, steam and the like. These vents are preferably located as shown in Fig. 2 in a circular series surrounding the base of the cover knob 56, but of course may be located in other positions and arrangements if desired. The vents are preferably formed by cutting slits in the sheet metal of the cover and inwardly depressing portions of the metal so as to provide the downwardly extending tongues or members 82. These members 82 are so formed as to facilitate depressing because of the downwardly inclined construction and act as baffles preventing the hot oil from splattering through the vents.

The operation and advantages of the corn popper will now be readily understood.

The electrical connection having been made to the electrical plug contacts 40 and to the heating element 38; and the oil or butter and the corn to be popped having been put in the pan 12 forming the bottom of the chamber A, the cover 16 is pressed down and snapped into place. When the heat is up, the corn begins to pop, the stirrer 64 meanwhile being turned by hand to produce uniformity of popping and prevent burning. The spattered oil hitting the walls and cover of the chamber A runs back into the pan baffled by the tongues 82 of the vents 80 in the cover 16 and prevented by the cover joint as well as by the pan seam-joint from working through to the outside of the device. The pan seam joint also prevents the oil from working down into the heating chamber B. The popped corn is readily removed from the device without burning the hands by gripping the legs 26 with one hand and gripping the cover knob 56 with the other hand, and pulling off the cover and dumping the contents.

The heat insulated bottom of the device efficiently directs the heat upwardly against the upper pan 12 and prevents its passage downwardly to any substantial extent so that the popper can be safely operated on any supporting surface without injury thereto.

The three piece body construction consisting of the partially telescoped and united barrel 10 and pans 12 and 14 avoids the use of a deep sided receptacle having an integral bottom which is a more expensive and less desirable construction than the foregoing.

I have illustrated and described a preferred and satisfactory embodiment of my invention but it will be understood that changes may be made therein within the spirit and scope thereof as set forth herein and defined in the appended claims.

What I claim is:

1. In a device of the character described, in combination, a metallic body therefor, comprising a corn popping chamber and a chamber for an electric heating element underneath the corn popping chamber; and combined leg-handle means consisting of vertical rods of heat insulating material secured to the sides of the metallic body, spaced therefrom, the lower ends of said rods extending well below the bottom of said heating element chamber, spacer means of heat insulating material between the body and said rods, and metallic tie means between said body and rods, said tie means passing through the spacer means.

2. A device of the character described having a two-chambered metallic body comprising the combination of a cylindrical barrel member, a cover for the upper end of said barrel member, the lower end of said barrel member having an inwardly directed shoulder and a downwardly directed cylindrical flange of smaller diameter than the body of the barrel member connected by said shoulder therewith, a shallow pan, and a deeper walled pan, the former telescoped snugly into the mouth of the deeper pan, the downward cylindrical flange of the barrel member being telescoped snugly into the mouth of the shallow pan, and means for uniting the aforesaid telescoped portions of said members.

3. In a device of the character described, in combination, a metallic body therefor, comprising a corn popping chamber, an electric heating element underneath the corn popping chamber, a cover for the corn popping chamber, a hand-grippable knob outwardly flanged at its upper end and consisting of heat insulating material on top of the cover secured centrally thereto, a stirrer wire having a shank extending freely through a vertical hole in said knob and cover, a handle-arm extending radially outwardly from said shank over and beyond said knob and having a stirrer portion supported by said shank below the cover.

4. In a device of the character described, in combination, a metallic body therefor, comprising a corn popping chamber, an electric heating element underneath the corn popping chamber, a cover for the corn popping chamber having an exposed hand-grippable knob flanged at its upper end and consisting of heat insulating material secured to the top thereof, and combined leg-handle means consisting of vertical rods of heat insulating material secured to the sides of the metallic body with their lower ends extending well below the bottom of the heating element chamber.

5. In a device of the character described, in combination, a metallic body therefor comprising a corn popping chamber, a cover for said chamber having a knob of heat insulating material secured on the top thereof, a stirrer wire having a shank extending freely through a vertical hole in said knob and cover, a handle-arm extending radially outwardly from said shank over the top of the cover and having a stirrer foot portion supported by said shank below the cover, the cover having vents adjacent the base of the cover knob and downwardly bent tongues to baffle said vents.

6. A device of the character described having an upper chamber and a lower chamber, including, in combination, a cylindrical member, a cover for the upper end of said cylindrical member, the lower end of said cylindrical member having a cylindrical flange, a pan, another pan, said first mentioned pan being telescoped snugly into one end of said other pan, said cylindrical flange of said cylindrical member being telescoped snugly into said first mentioned pan to form a sealed construction with said pans.

7. A device of the character described having a two-chambered metallic ody comprising the combination of a cylindrical barrel member, a cover for the upper end of said barrel member, the lower end of said barrel member having an inwardly directed shoulder and a downwardly directed cylindrical flange of smaller diameter than the body of the barrel member connected by said shoulder therewith, a shallow pan, and a deeper walled pan, the former telescoped snugly into the mouth of the deeper pan, the downward cylindrical flange of the barrel member being telescoped snugly into the mouth of the shallow pan.

8. A device of the character described having an upper chamber and a lower chamber, including, in combination, a cylindrical member, a cover for the upper end of said cylindrical member, the lower end of said cylindrical member having a cylindrical flange, a shallow pan, another pan, said shallow pan being telescoped into one end of said other pan, said cylindrical flange of said cylindrical member being telescoped into said shallow pan to form a sealed construction with said pans, and means for rigidly connecting said flange and pans together.

9. A device of the character described, including a body having a corn popping chamber and a heating chamber underneath the corn popping chamber, a heating element in said heating chamber, disc means for supporting said heating element, heat insulating material between said disc means and the bottom of said heating chamber, and means for connecting said disc means to the bottom wall of said heating chamber.

10. A device of the character described, including a body having a corn popping chamber and a heating chamber for a heating element underneath the corn popping chamber, a heating element in said heating chamber, disc means for supporting said heating element, heat insulating material between said heating element and the bottom of said heating chamber, and means for connecting said disc means to said heating chamber, said heating chamber having its bottom wall provided with an upwardly cupped portion to provide a support for said disc means.

11. A device of the character described having an upper corn popping chamber and a lower heating chamber, including, in combination, a cylindrical member, a cover for the upper end of said cylindrical member, the lower end of said cylindrical member having a cylindrical flange, a shallow pan, another pan, said shallow pan being received and held within one end of said other pan, said cylindrical flange of said cylindrical member being received and held within one end of said shallow pan, said pans forming said heating chamber, and a heating element in said heating chamber.

12. A device of the character described having an upper corn popping chamber and a lower heating chamber, including, in combination, a cylindrical member, a cover for the upper end of said cylindrical member, the lower end of said cylindrical member having a cylindrical flange, a shallow pan, another pan, said shallow pan being received and held within one end of said other pan, said cylindrical flange of said cylindrical member being received and held within one end of said shallow pan, said pans forming said heating chamber, and a heating element in said heating chamber, and means for mounting said heating element in said heating chamber.

13. A device of the character described, including, in combination, a body having a corn popping chamber and a heating chamber underneath the corn popping chamber, an electric heating element in said heating chamber, plate electrical insulation means for supporting said heating element, heat insulating material in the bottom of said heating chamber, said heating chamber being provided with an upwardly cupped portion to support said plate electrical insulation means.

14. A device of the character described, including, in combination, a body having a corn popping chamber and a heating chamber underneath the corn popping chamber, an electric heating element in said heating chamber, plate electrical insulation means for supporting said heating element, heat insulating material in the bottom of said heating chamber, said heating chamber being provided with an upwardly cupped portion, said plate insulation means resting on said upwardly cupped portion of said heating chamber.

15. In a device of the character described, in combination, a body comprising a corn popping chamber and a heating chamber underneath the corn popping chamber, an electric heating element in said heating chamber, said body comprising a tubular member having at its upper end an inwardly directed shoulder and an upstanding flange of smaller diameter than said tubular member, a cover for the upper end of said tubular member and having a rim portion with an inwardly directed shoulder for cooperating with and bearing down upon said upstanding flange of said body, said shoulder on said cover leading to and supporting a flange which telescopes snugly into the upstanding flange of said tubular member, said flange on said cover having a lip adapted to snap under said shoulder on said tubular member.

16. In a device of the character described, in combination, a metallic body comprising a corn popping chamber and a chamber for an electric heating element underneath the corn popping chamber, said body comprising a cylindrical barrel member having at its upper end an inwardly directed shoulder and an upstanding cylindrical flange of smaller diameter than the body of the barrel member connected by said shoulder therewith, a cover for the upper end of said barrel member having a rim portion with an inwardly directed shoulder for cooperating with and bearing down upon the rim of the aforesaid upstanding cylindrical flange of the metallic body of the device, said shoulder leading to and supporting a cylindrical flange which telescopes snugly into the cylindrical upstanding flange of the barrel member, said cylindrical flange of the cover having an angular cross sectioned lip constructed to snap under the shoulder at the upper end of the barrel member.

17. In a device of the character described, in combination, a metallic body comprising a corn popping chamber and a chamber for an electric heating element underneath the corn popping chamber, said body comprising a cylindrical barrel member having at its upper end an inwardly directed shoulder and an upstanding cylindrical flange of smaller diameter than the body of the barrel member connected by said shoulder therewith, a cover for the upper end of said barrel member having a rim portion with an inwardly directed shoulder leading to and supporting a cylindrical flange which telescopes snugly into the cylindrical upstanding flange of the barrel member, the lower end of said barrel member having an inwardly directed shoulder and a downwardly directed cylindrical flange of smaller diameter than the body of the barrel member connected by said shoulder therewith, a shallow pan and a deeper walled pan, the former telescoped snugly into the mouth of the deeper pan, the downwardly directed cylindrical flange of the barrel member being telescoped snugly into the mouth of the shallow pan, and means for uniting the aforesaid telescoped portions of said pans and barrel member.

18. A device of the character described having an upper chamber and a lower chamber, including, in combination, a tubular member, the lower end of said tubular member having a flange, a pan, another pan, said first mentioned pan being fitted into one end of said other pan, said flange on said tubular member being fitted into said first mentioned pan to form a sealed construction with said pans.

19. A device of the character described having an upper chamber and a lower chamber, including, in combination, a tubular member, the lower end of said tubular member having a flange, a pan, another pan, said first mentioned pan being fitted into one end of said other pan, said flange on said tubular member being fitted into said first mentioned pan to form a sealed construction with said pans, and means for connecting said flange and pans together.

20. A device of the character described having an upper chamber and a lower chamber, including, in combination a tubular member, the lower end of said tubular member having a flange, a pan, another pan, said first mentioned pan being fitted into one end of said other pan, said flange on said tubular member being fitted into said first mentioned pan to form a sealed construction with said pans, legs for supporting said device, and common means for connecting said legs to said device and for connecting said flange and pans together.

21. A device of the character described, including a body having a corn popping chamber and a heating chamber for a heating element underneath the corn popping chamber, a heating element in said heating chamber, disc means for supporting said heating element, said heating chamber having its bottom wall provided with an upwardly cupped portion, and means for securing said disc means to the upwardly cupped portion of said bottom wall.

22. A device of the character described, including a body having a corn popping chamber and a heating chamber for a heating element underneath the corn popping chamber, a heating element in said heating chamber, disc means for supporting said heating element, said heating chamber having its bottom wall provided with an upwardly cupped portion, said disc means being supported by said upwardly cupped portion.

23. A device of the character described, including, in combination, a body having a corn popping chamber and a heating chamber underneath said corn popping chamber, an electric heating element in said heating chamber, plate electrical insulation means for supporting said heating element, said heating chamber having its bottom wall provided with an upwardly cupped portion, said plate electrical insulation means resting on said upwardly cupped portion of said heating chamber, means for securing said plate electrical insulation means to said upwardly cupped portion, and heat insulation material in the bottom of said heating chamber beneath said plate electrical insulation means.

24. A device of the character described, having an upper chamber and a lower chamber including, in combination, a body member comprising a pan, another pan, said first mentioned pan being fitted into one end of said other pan to form said lower chamber therebetween, a heating element in said lower chamber and heat insulation material beneath said heating element.

25. A device of the character described, having an upper chamber and a lower chamber, including in combination, a body member comprising a pan, another pan, said first mentioned pan being fitted into one end of said other pan to form said lower chamber therebetween, an electric heating element in said lower chamber, plate electrical insulation means for supporting said electric heating element, and heat insulation material between said plate electrical insulation means and the bottom of said lower chamber.

26. A device of the character described having an upper chamber and a lower chamber, including, in combination, a body member comprising a pan, another pan, said first mentioned pan being fitted into one end of said other pan to form said lower chamber therebetween, a heating element in said lower chamber, said other pan having an upwardly cupped portion to form a support for an insulation means for said heating element.

STEPHEN A. PLATT.